United States Patent
Peterkort

(12) 
(10) Patent No.: US 6,290,442 B1
(45) Date of Patent: Sep. 18, 2001

(54) LOCKING FASTENER ASSEMBLY FOR THREADED JOINT

(75) Inventor: Steven D. Peterkort, Hawthorn Woods, IL (US)

(73) Assignee: Okabe Corporation, Inc., Vernon Hills, IL (US)

(*) Notice: Subject to any disclaimer, the term of this patent is extended or adjusted under 35 U.S.C. 154(b) by 0 days.

(21) Appl. No.: 09/168,326

(22) Filed: Sep. 28, 1998

Related U.S. Application Data

(63) Continuation of application No. 08/932,662, filed on Sep. 18, 1997.

(51) Int. Cl.[7] .............................. F16B 39/04; F16B 39/28
(52) U.S. Cl. ......................... 411/140; 411/120; 411/214; 411/221
(58) Field of Search .................................. 411/115, 120, 411/121, 140, 214, 215, 219, 221

(56) References Cited

U.S. PATENT DOCUMENTS

| | | | |
|---|---|---|---|
| 642,701 | * 2/1900 | Llewellyn | 411/140 |
| 930,148 | * 8/1909 | Brown | 411/140 |
| 1,229,783 | * 6/1917 | Pogue | 411/120 |
| 1,231,840 | * 7/1917 | Bolt | 411/140 |
| 5,533,794 | * 7/1996 | Faison | 411/115 X |
| 5,674,034 | * 10/1997 | Bennett | 411/120 X |

* cited by examiner

*Primary Examiner*—Neill Wilson
(74) *Attorney, Agent, or Firm*—Mayer, Brown & Platt

(57) ABSTRACT

A highly adjustable free spinning positively locking fastener assembly for threaded joints such as automotive or truck wheel assemblies includes a nut having a flange with a retainer washer captured on the nut flange via a locking bolt. The washer includes a tab received in a slot of a wheel spindle to permit the washer to move axially and prevent the washer from rotating. Bolt holes are located at unequally spaced opposed locations in the flange of the nut. A plurality of locking bolts locking the nut to the washer to prevent relative rotation so that neither the nut nor the washer can rotate relative to the spindle. The locking bolts are torsionally inserted into the locking bolt holes located in the nut. At least one locking bolt extends through at least one of the corresponding locking teeth of the washer. When the locking bolts are inserted into the locking bolt holes, the locking bolts engage the teeth of the washer to prevent the nut from rotating.

17 Claims, 2 Drawing Sheets

LOCKING FASTENER ASSEMBLY FOR THREADED JOINT

RELATED APPLICATION

This is a continuation in part application of Ser. No. 08/932,662, filed Sep. 18, 1997.

FIELD OF THE INVENTION

The present invention relates to locking fastener assemblies for threaded joints and more particularly to improvements in free-spinning locking fastener assemblies that are positively locked after installation.

BACKGROUND OF THE INVENTION

Locking fasteners and locking fastener assemblies are used to prevent loosening of a threaded fastener in a fastener joint. There are many types of threaded joints in which loosening of a fastener is undesirable. One example to which the principles of the present invention may be applied is an axle assembly of a vehicle, including automobiles, trucks, trailers or other motorized craft.

In a typical axle assembly, axle bearings are supported between an axle or spindle and a wheel hub or spindle support to permit rotation of a vehicle wheel. An axle bearing nut is used to hold the components together. In order to prevent premature bearing failure, the nut must be installed properly to avoid excessive axial bearing load or, alternatively, excessive free play. In addition, after assembly it is important to prevent loosening of the axle bearing nut to avoid bearing failure or even dangerous loss of a wheel.

A conventional axle assembly includes a spindle with male threads having an axially extending slot. A washer received on the spindle has a tab in the slot to prevent rotation of the washer. After the nut is threaded onto the spindle and tightened to the desired degree, part of the washer is deformed to lock the washer to the nut and prevent further rotation of the nut.

This conventional approach has disadvantages. One serious problem, especially in original mass production, is that installation of the washer and nut requires too many manual assembly steps. Another disadvantage is that the washer must be deformed both after installation of the nut and again when it is desired to remove the nut. The fact that the nut and washer are separate pieces makes it possible for the assembly to be installed improperly, for example without the washer or with an incorrect or damaged washer. Moreover, the locking of the nut against rotation is not as positive as desired because the washer can be deformed or broken.

Another disadvantage of previous systems is that once the desired end play or bearing pre-load has been achieved, the inner nut or outer nut/locking washer/locking element must again be rotated. This additional adjustment is required to turn the elements clockwise or counter-clockwise in order to align and subsequently engage the locking element(s). This final movement to align and lock the components subsequently defeats the "final" pre-load or end play adjustment that has just been achieved. In essence, the lock nut system final adjustment is not final until this last adjustment is made.

Before the locking element can be engaged, however, the nut must be rotated clockwise or counterclockwise in order to align and engage the locking clip. In order to accomplish this final engagement, the application tool must be applied in order to deflect the locking clip, thus allowing the free rotation of the nut.

In order to overcome such disadvantages of the conventional assembly, it has been proposed to provide locking fastener assemblies in which a washer and a nut are normally locked against rotation and in which the installation tool or wrench can be manipulated to free the nut for rotation. Examples of such proposals can be found in U.S. Pat. Nos. 3,851,690 and 3,942,570. While the assemblies disclosed in these patents overcome some disadvantages of the conventional nut and washer, they are subject in turn to other disadvantages. They include relatively delicate mechanisms requiring complex movements and are not well suited to the types of forces and environments encountered by automotive vehicles. In addition, they require special manipulation of an installation tool or wrench over and above the normal use of a wrench with a nut.

Another prior approach has been to use a nut and a non-rotating retainer normally separated by a spring and having interfacing teeth or similar locking structures. As the assembly is tightened, the spring force is overcome and the nut becomes locked to the retainer to prevent further rotation. In addition to complexity and expense, the arrangement has the disadvantage that as the nut reaches its final position, it is not free spinning. The ragged, uneven torque characteristic interferes with the use of torque detecting equipment that could otherwise detect a predetermined degree of tightening of the fastener assembly. Also, this assembly requires at least the amount of pre-load necessary to compress the spring normally separating the nut from the retainer.

U.S. Pat. No. 4,812,094 discloses a free spinning positively locking fastener assembly for threaded joints such as automotive or truck wheel assemblies. That assembly includes a nut having a flange with a retainer washer captured on the nut flange. The washer includes a tab received in a slot of a wheel spindle to permit the washer to move axially and prevent the washer from rotating. A locking clip locks the nut to the washer to prevent rotation of the nut relative to the spindle. The locking clip is released by engagement of a wrench socket with the wrenching structure of the nut so that the nut can be threaded to a desired position. When the wrench socket is removed, a locking finger on the clip engages the washer to prevent the nut from rotating.

This locking fastener assembly has suffered from disadvantages. One disadvantage is that the locking clip according to U.S. Pat. No. 4,812,094 is located at a corner of the wrenching structure where two wrenching flats intersect. In automotive assembly operations, impact wrench drivers are used to install wheel fastener assemblies, resulting in wear of wrench sockets. The problem of socket wear is particularly acute for sockets that are formed from sheet metal rather than being forged, as is common in larger socket sizes. Socket wear results in deformation of the corners of the sockets such that a socket that remains effective for tightening the nut of the fastener assembly is nevertheless ineffective to release the locking clip located at a corner of the nut. If the clip is not released, the clip can be destroyed in the tightening or loosening operation, resulting in an installed wheel hub with the nut not locked and engaged with the retainer. This allows the nut to rotate on the spindle.

Another disadvantage of the known locking fastener assembly is that with the clip located at a corner of the nut, the nut engages the edges of the clip latch release segment. Contact with the edges is not as effective or as reliable as a firm face to face contact in the plane of the latch release segment.

Use of a single locking clip in accordance with U.S. Pat. No. 4,812,094 results in an arrangement wherein the locking function is dependent on a single component. In addition, a single resilient clip located between the nut and the retainer washer introduces an imbalance because the resilient clip tends to separate the nut and the washer at a single point around the periphery of the nut. Also, the single locking clip can only be positioned into one of the grooves, limiting the nut to one of N position, where N is the number of grooves.

To overcome the deficiencies of the use of a single clip a two clip system is disclosed in U.S. Pat. No. 5,597,278. The two locking clip system can only be positioned into one diametrically opposite grooves, limiting the nut to one of N positions. Where N is the number of grooves and before the locking clips can be aligned and engaged, the nut must be rotated, thus altering the end point or pre-load settings.

OBJECTS AND SUMMARY OF THE INVENTION

Accordingly, there is a need for a locking fastener which overcomes the disadvantages and limitations of the devices found in the prior art. Other needs will become apparent upon a further reading of the following detailed description, taken in conjunction with the drawings.

The locking fastener assembly of the present invention is a free spinning, positively locking fastener assembly for use with threaded joints in wheel assemblies, such as in automotive or truck/trailer wheel assemblies. The locking fastener assembly includes a nut having a flange which is drilled and tapped in three (3) places with a staggered asymmetric hole pattern into which are removably inserted up to (3) locking bolts. This invention includes a separate washer with 32 evenly spaced, outer locking teeth on the periphery of the washer with the centerline of the slot on the same pitch circle diameter as the corresponding center line of the bolt holes in the flange of the nut. The washer includes a tab received in a slot of a wheel spindle to permit the washer to move axially and prevent the washer from rotating.

After assembly and final bearing adjustment the 3 locking bolts are torsionally seated and locked in place with a locking patch on the threads. Due to the staggered asymmetrical bolt locations in the flange of the nut, the (¼") diameter of the locking bolts and the equal spacing of the ⁵⁄₁₆' width of the locking teeth of the washer, at least one, and often more, locking bolts will extend through at least one of the corresponding locking teeth of the washer and subsequently prevent the nut from rotating.

Other wheel bearing locking nut systems require the locking nut and the corresponding locking elements to be rotated or adjusted in some way after bearing adjustment in order to securely engage the locking elements. This movement will then alter the bearing end play adjustment. The purpose of the accurate bearing adjustment in the present invention is to overcome the need to substantially readjust the locking elements thereby maintaining the end play of the wheel bearing. The ability of the present invention to provide a high number of adjustment positions not present in other locking fastener assemblies ensures the maintenance of the end play of the wheel bearing.

The features of the present invention, other than those specifically set forth above, will become apparent in the detailed description of the invention and drawings set forth below.

DETAILED DESCRIPTION OF THE INVENTION

Figure 1:
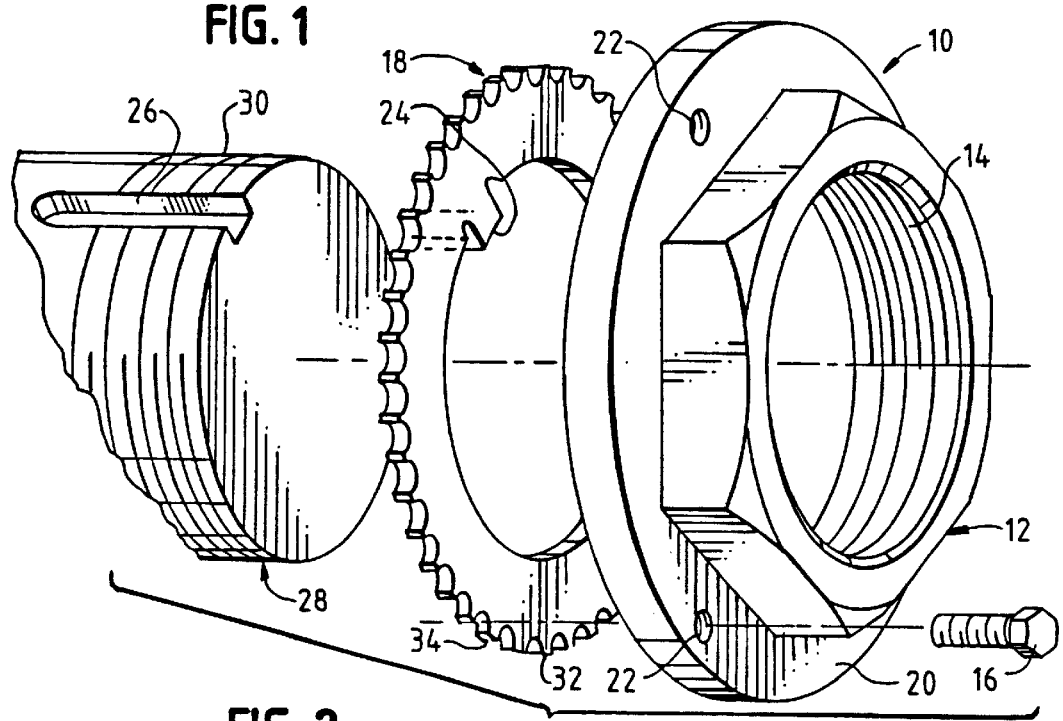
FIG. 1 is a perspective view showing the components of the locking fastener assembly prior to assembly.
Figure 5:
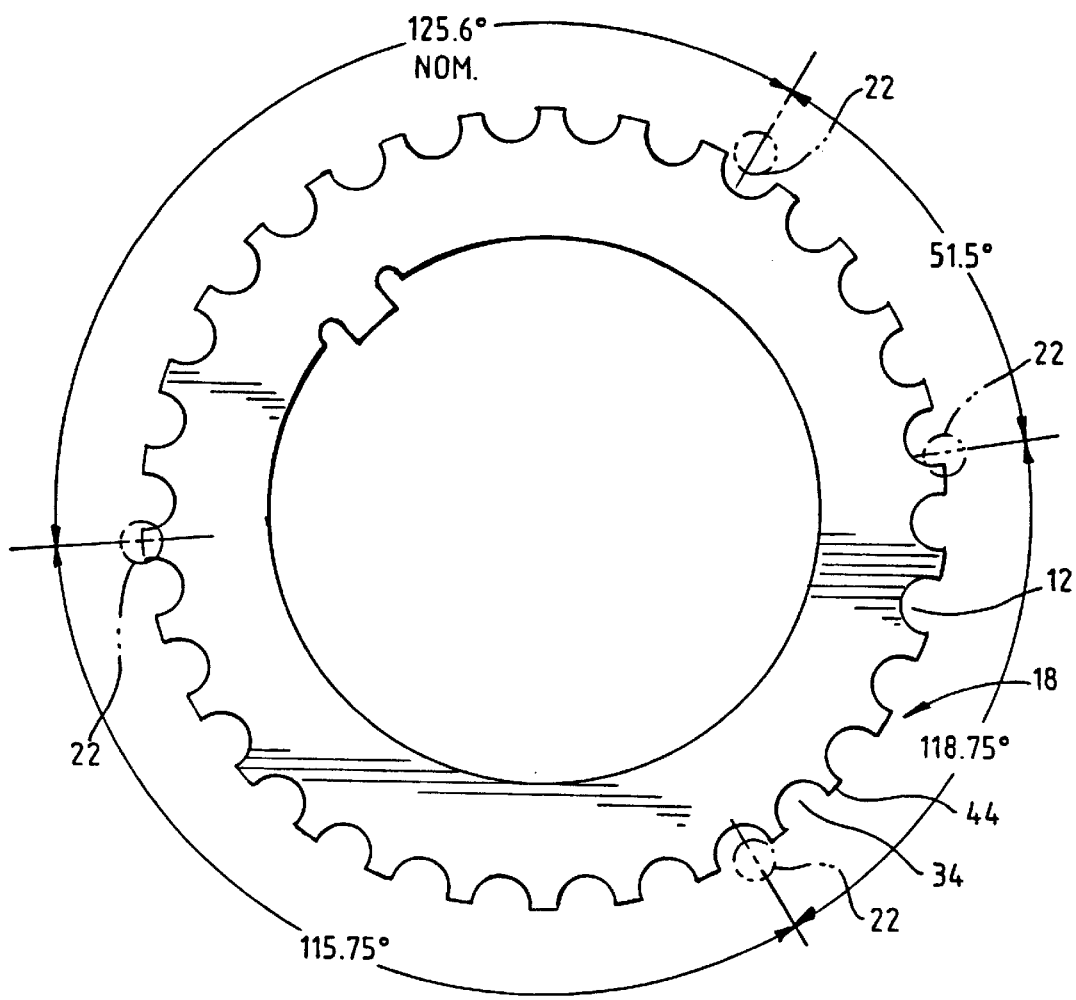
FIG. 5 is an alternative top plan view of a retainer washer of that shown in FIG. 3.

FIG. 1 is a perspective view showing the components of the locking fastener assembly prior to assembly 10. The locking fastener assembly 10 comprises a nut 12 with axial threads 14, at least one locking bolt 16, and a retainer washer 18. The nut 12 has a flange 20 with slots or tapped bolt holes 22 where the locking bolts 16 are receivable. As shown the retainer washer 18 has a tongue 24 which fits in to a slot 26 in a spindle 28, having axial threads 30, thereby limiting the axial rotation of the retainer washer 18 and the nut 12 when fully assembled. Also, the retainer washer 18 is shown with about 32 evenly spaced teeth 32 along the retainer washer's periphery 34 that are engageable with the locking bolt or bolts 16. Alternatively, the retainer washer is shown in FIG. 5 having 30 teeth, or one every 12 degrees as a typical configuration. The number of teeth may thus be adjusted as required for the application desired.

Figure 2:
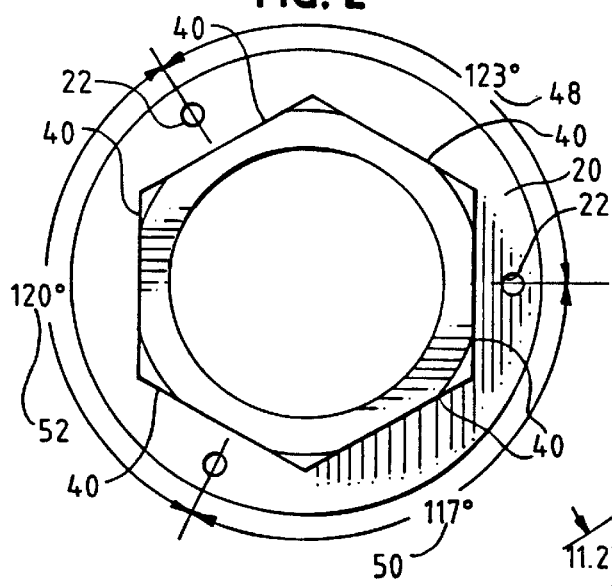
FIG. 2 is top plan view of a lock nut.

FIG. 2 is top plan view of a lock nut 12. As shown the nut 12 of the locking fastener assembly 10 (shown in FIG. 1) has six wrenching flats 40 that are receivable to a wrench (not shown) for tightening and loosening the nut 12 by rotation clockwise or counter-clockwise on threads 14. The flange 20 has three bolt holes 22 that can be threaded so that a locking bolt 16 (shown in FIG. 1) can be fed to secure the nut 12 to the retainer washer 18. The Figure shows 3 locking bolts 16 that secure the nut 12 to the retainer washer 18.

Now referring back to FIG. 1 the flange 20 may have any number of bolt holes 22 to provide a greater or lesser number of adjustment positions. FIG. 1 shows three tapped holes 22 staggered, per FIG. 2, and pre assembled with three locking bolts 16 with a nylon locking patch. Once final assembly and adjustment is complete, all three bolts 16 can be driven through the tapped holes 22 of the flange 20 and will then pass through at least one of the shown notches 38 of the washer 18, thus securing the nut 12 which is axially threaded (at 14) from rotating and effectively securing the nut 12 to the washer 18. Alternatively, only one bolt 16 can be driven through the tapped holes of the flange 20 and will then pass through at least one of the shown notches 38 of the washer, thus securing nut 12. The number of bolts 16 driven through the tapped holes 22 of the flange 20, will be determined by the ultimate application of the claimed device.

As shown in FIG. 5, the number of teeth or slots can be amended from the 32 shown in FIG. 3 to 30 teeth as shown in this FIG. 5. The tapped holes 22 of the flange 20 can be positioned in a staggered fashion. They can be located, for example, at 120, 123, 117 degrees on the circumference to 125.5, 118.75 and 115.75 degrees on the circumference. A fourth hole 22 can be placed, for example at 51.5 degrees.

Figure 3:
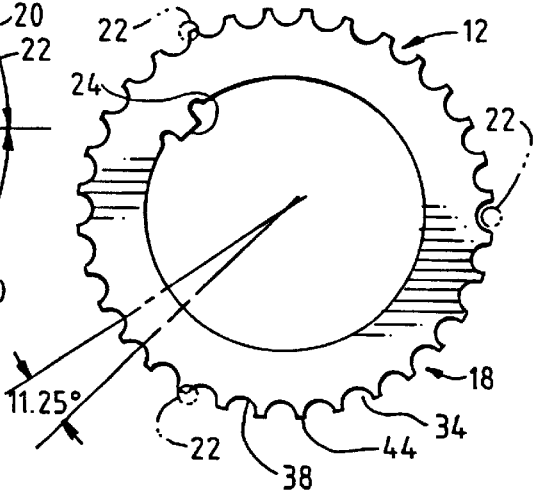
FIG. 3 is a top plan view of a retainer-washer.

The configuration of the washer shown in this FIG. 5 can be substituted for that shown in FIG. 3. Both configurations provide a multitude of positions in which the nut can be secured. As shown, the teeth 44 of the retainer washer are equally spaced, however the spacing of the bolt holes 22 are positioned so that at least one of the bolts 16 is receivable through both a notch 38 and a bolt hole 22. An alternate embodiment provides for more than one bolt 16 being received through both a notch 38 and a bolt hole 22.

As an example in FIG. 1, the nut 12 has bolt holes 22 in the flange 20 through which locking bolts 16 can be fed to secure the retainer washer 18 with the nut 12. The bolt holes 22 have threads 42 for securing the locking bolts 16 in place. The nut 12 has axial threads 14.

FIG. 3 is a top plan view of a retainer washer 18. The retainer washer 18 has a notched periphery 34. In a preferred embodiment there are 32 equally spaced locking teeth 44 forming 32 notches 38 in the notched periphery 34 of the retainer washer 18, however any number of teeth 44 could be used to provide the notches 38 in the notched periphery 34 of the retainer washer 18. A tongue 24 is located in the inner portion of the retainer washer 18. The retainer washer 18 can be made by press stamping sheet metal or by any other suitable means. The retainer washer 18 can also be made from other materials such as a suitable plastic.

As can also be seen in FIG. 3 the retainer washer 18 is superimposed onto the nut 12 showing the alignment of the notches 38 of the notched periphery 34 of the retainer washer 18 and the bolt holes 22 in the flange 20 of the nut 12. The present invention has the novel feature of providing numerous positions in which the nut 12 can be secured. As shown the teeth 44 of the retainer washer 18 are equally spaced however the spacing of the bolt holes 22 are positioned so that at least one of the bolts 16 is receivable through both a notch 38 and the bolt hole 22.

Figure 4:
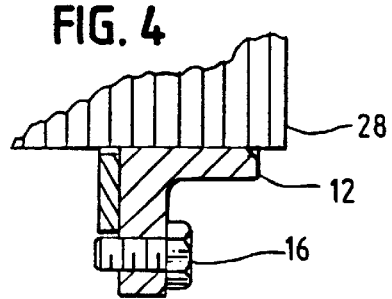
FIG. 4 is a sectional view of the locking fastener assembly fully assembled using locking bolts to secure the locking fastener assembly.

FIG. 4 is a side-cross sectional view of the locking fastener assembly 10 shown fully assembled. As shown when the locking fastener assembly 10 is fully assembled the nut 12 is in close proximity with the retainer washer 18. The locking bolts 16 are fed through the bolt holes 22 in the flange 20 of the nut 12 and locking bolt nuts 48 may alternatively be thereon applied securing the locking nut assembly. At least one locking bolt 16 is receivable to one of the three bolt holes 22. In a preferred embodiment only one bolt 16 is receivable to any one of the three bolt holes 22 and the 32 notches of the notched periphery 34 of the retainer washer 18 thereby ensuring that there are 96 possible positions of the locking fastener assembly 10.

FIG. 5 is a top view of an alternative arrangement of the locking washer.

Referring to FIGS. 1–5, there is shown a highly adjustable locking fastener assembly 10 for axle bearings and similar applications which is free spinning during installation and adjustment and removal and is positively held against rotation after installation. The locking fastener assembly 10, which includes three locking bolts 16, is engageable with an axially slotted male threaded shaft or spindle 28. A hardened locking retainer washer 18 which includes about 32, equally spaced locking teeth 44 and an internal locking tab 24 is an integral component of the locking fastener assembly 10. The internal locking tab 24 of the washer 18 is received by the axial slot 26 in the spindle 28 permitting the axial movement of the retainer washer 18 but does not permit rotational or angular movement in its interface with a wheel bearing (not shown).

The nut 12 has a flange 20 and is free spinning. At least one, and more typically, three or four unequally spaced bolt holes 22 in the flange 20 of the nut 12 are parallel to the axial threads 14 and perpendicular to the corresponding locking notches 38 of the retainer washer 18. These provide means for locking the retainer and the flange in substantial alignment with at least one of the openings in the flange and the notched periphery of the retainer washer.

The nut 12 has a hexagonal wrenching surface forming wrenching flats 40, allowing the nut 12 to be engaged by a wrench (not shown) for installation, bearing sealing, adjustment and removal. The nut 12 has an internal thread 14 allowing the nut 12 to engage and thread on to the spindle 28 having male threads 30.

After the locking fastener assembly 10 is installed and adjusted, at least one, and up to three or four locking bolts 16 are torsionally driven through the flange 20 in the nut 12 and also between the teeth 44 in the retainer washer 18. All three of the locking bolts 16 may be torsionally driven through the flange 20 in the nut 12 and at least one, or one to two, of the locking bolts 16 will engage. In any event, at least one locking bolt 16 will engage. Due to the equally spaced locking notch 38 of the retainer washer 18 and the unequally spaced bolt holes 22 in the flange 20 of the nut 12 at least one locking bolt 16 is always receivable through the unequally spaced bolt hole 22 and the locking teeth 44 of the retainer washer 18 which locks the nut 12 to the retainer washer 18. The retainer washer 18 is locked to the axial slot 26 of the male threaded spindle 28 by the internal tab 24. The nut 12 and retainer washer 18 are locked onto the male threaded spindle 28 and are prevented from frictional torsional rotation in use.

In an alternative embodiment the two other bolts 16 may be installed to apply an axial load on the top surface of the flange 20, for instance, if the first bolt 16 does not pass through both the bolt hole 22 in the flange 20 and the notch 38. In this case the axial load of the locking bolt 16 to the retainer washer 18 will subsequently apply a light load on the bearing face (not shown). This load will help prevent creeping which is a common problem in vehicle use.

Also referring to FIGS. 1–5, the number of positions may be altered as needed for a given application. Where T is equal to the number of teeth 44 in the notched periphery 34 of the retainer washer 18; B is equal the number of bolt holes 22; and, P is equal to the number of positions possible for the locking fastener assembly. The number of positions possible for a given locking fastener assembly 10 where there are multiple bolt holes 22 and only one may be fitted with a locking bolt 16 at any one time: P=T×B Positions. More particularly, none of the angles 48, 50 or 52 (FIG. 2) is divisible by any integer multiple of angle 46 (FIG. 3). The number of possible positions is equal to the product of the number of equally spaced teeth 44 in the notched periphery 34 of the retainer washer 18 and the number of bolt holes 22 where only one locking bolt 16 is receivable at a time. Further embodiments are possible where more than one locking bolt 16 is receivable thereby diminishing the number of possible positions.

FIG. 5 shows an alternative configuration of the washer showing the nut hole locations in conjunction with a 30 tooth washer. In this configuration, the locking teeth 44 of the washer are spaced at approximately equal intervals or at slightly staggered intervals so as to allow engagement that prevents rotational movement after assembly of the device. This configuration allows engagement and locking with a mere 3–5 degrees of rotation in the final adjustment of the device. This also can be accomplished without the arrangement of additional plates and the like, providing for ease of adjustment.

The tongue 24 that fits into slot 26 in spindle 328 provides one means of preventing rotational movement. The additional use of the locking bolts 16, that are inserted into bolt holes 22, prevents the rotational movement of the device. This allows the nut 12 to be secured to the retainer washer 18. The use of this system obviates the need for an additional tool such as disclosed by Cronin, II in U.S. Pat. No.

5,618,143. Cronin also requires that rotational movement be prevented by means of a tab and slot arrangement only. Further, Cronin, requires the upper end of the teeth be bent in order to provide engagement means at assembly. This does not provide the secure means for prevention of rotational movement as disclosed herein.

Similarly, Pischek at U.S. Pat. No. 2,561,224 discloses a plate that is engaged by a portion of the nut, wherein the plate has "zones" of teeth that project for engagement with means to prevent rotational movement. Pischek requires that the zones be evenly spaced along the crescent shaped plat, and does not provide ease of assembly as the plate must be engaged in addition to other steps of assembly. The teeth of Pischek are also evenly spaced along the zones, but not continuous along the periphery of the nut. This is in sharp contrast to the within invention that allows quick and easy assembly with simple and certain adjustment that prevents rotational movement. Pischek also does not provide a secure anchor system such as the bolt arrangement disclosed in the instant application.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by claims appended hereto, rather than by the foregoing description, and all changes which come within the meaning and range of equivalency of the claims are intended to be embraced herein.

What is claimed is:

1. A threaded joint assembly of the type tightened or loosened by a tool and comprising:
   a. a substantially fixed structure including a threaded member extending along an axis and including an axially extending slot;
   b. a locking fastener assembly engageable with the substantially fixed structure including a rotatable fastener and retainer;
   c. the rotatable fastener having at least two surfaces cooperatively positioned to engage a fastening tool, a flange having a plurality of unequally spaced openings extending therethrough, and a threaded structure engageable with the threaded member;
   d. the retainer having an outer margin defining a plurality of notches, the retainer also including a radially inwardly extending tab that is engageable with the axially extending slot; and
   e. means for locking the retainer and the flange in substantial alignment with at least one of the openings in the flange and the notched periphery of the retainer.

2. A threaded joint assembly as claimed in claim 1 wherein the retainer is a washer.

3. A threaded joint assembly as claimed in claim 1 wherein means for locking the retainer and the flange is a bolt and threaded hole combination.

4. A threaded joint assembly as claimed in claim 1 wherein the first restraining means is an axially extending slot in the threaded member and the second restraining means is a radially inwardly extending tab on the washer.

5. A rotatable fastener for use with a locking fastener assembly having a threaded member and a securing means comprising:
   a. at least two surfaces cooperatively positioned to engage a fastening tool;
   b. a flange having a plurality of unequally spaced openings extending therethrough;
   c. the unequally spaced openings being receivable to means for securing the locking fastener assembly; and,
   d. the unequally space openings being configured to receive means for securing the locking fastener assembly.

6. A threaded joint assembly of the type tightened or loosened by a tool and comprising:
   a. a threaded member extending along an axis and including first restraining means;
   b. a locking fastener assembly engageable with the substantially fixed structure including a rotatable fastener and a retainer;
   c. the rotatable fastener having at least two surfaces cooperatively positioned to engage a fastening tool, a flange having a plurality of unequally spaced openings extending therethrough, and a threaded structure engageable with the threaded member;
   d. the retainer having an outer margin defining a plurality of notches spaced in non-integer multiples of the unequal spaced openings and including means for holding the retainer in the threaded joint assembly with the flange;
   e. the retainer further including a second restraining means engageable with the first restraining means for preventing angular movement of the retainer relative to the threaded member; and,
   f. means for locking the retainer and the flange in alignment with at least one of the openings in the flange and the notched periphery of the retainer.

7. A threaded joint assembly as claimed in claim 6 wherein the retainer is a washer.

8. A threaded joint assembly as claimed in claim 6 wherein the retainer has from about 25 to about 35 equally spaced notches.

9. A threaded joint assembly as claimed in claim 6 wherein the retainer has about 30 equally spaced notches.

10. A threaded joint assembly as claimed in claim 6 wherein the retainer has about 32 equally spaced notches.

11. A threaded joint assembly as claimed in claim 6 wherein means for locking the retainer and the flange combination is a bolt and tapped hole through the flange.

12. A threaded joint assembly as claimed in claim 6 wherein the first restraining means is an axially extending slot in the threaded member and the second restraining means is a radially inwardly extending tab on the washer.

13. A threaded joint as claimed in claim 6 wherein the threaded member includes male threads and the locking fastener is a nut.

14. A threaded joint as claimed in claim 6, the retainer comprising a washer, the first restraining means comprising an axially extending slot in the male threads and the second restraining means comprising a tab portion of the washer.

15. A locking fastener assembly comprising:
   a threaded member including a notch;
   a threaded rotatable fastener having a flange, said flange including a plurality of unequally spaced openings extending through said flange, wherein said threaded rotatable fastener is engageable with said threaded member;
   a retainer including an outer margin defining a plurality of notches, said retainer further including a protruding member, wherein said protruding member is engageable with said notch on said threaded member; and
   a locking pin, wherein said locking pin is engageable with at least one of said unequally spaced openings in said threaded rotatable fastener and with at least one of said notches in said retainer.

16. A locking fastener assembly as claimed in claim 15, wherein said unequally spaced openings include threads and wherein said pin is a bolt that is engageable with said threads in said unequally spaced openings.

17. A locking fastener assembly as claimed in claim 15, wherein said notch on said threaded member is an axially extending slot, and wherein said protruding member is an radially inwardly extending tab.

* * * * *